No. 781,245.                                                         Patented January 31, 1905.

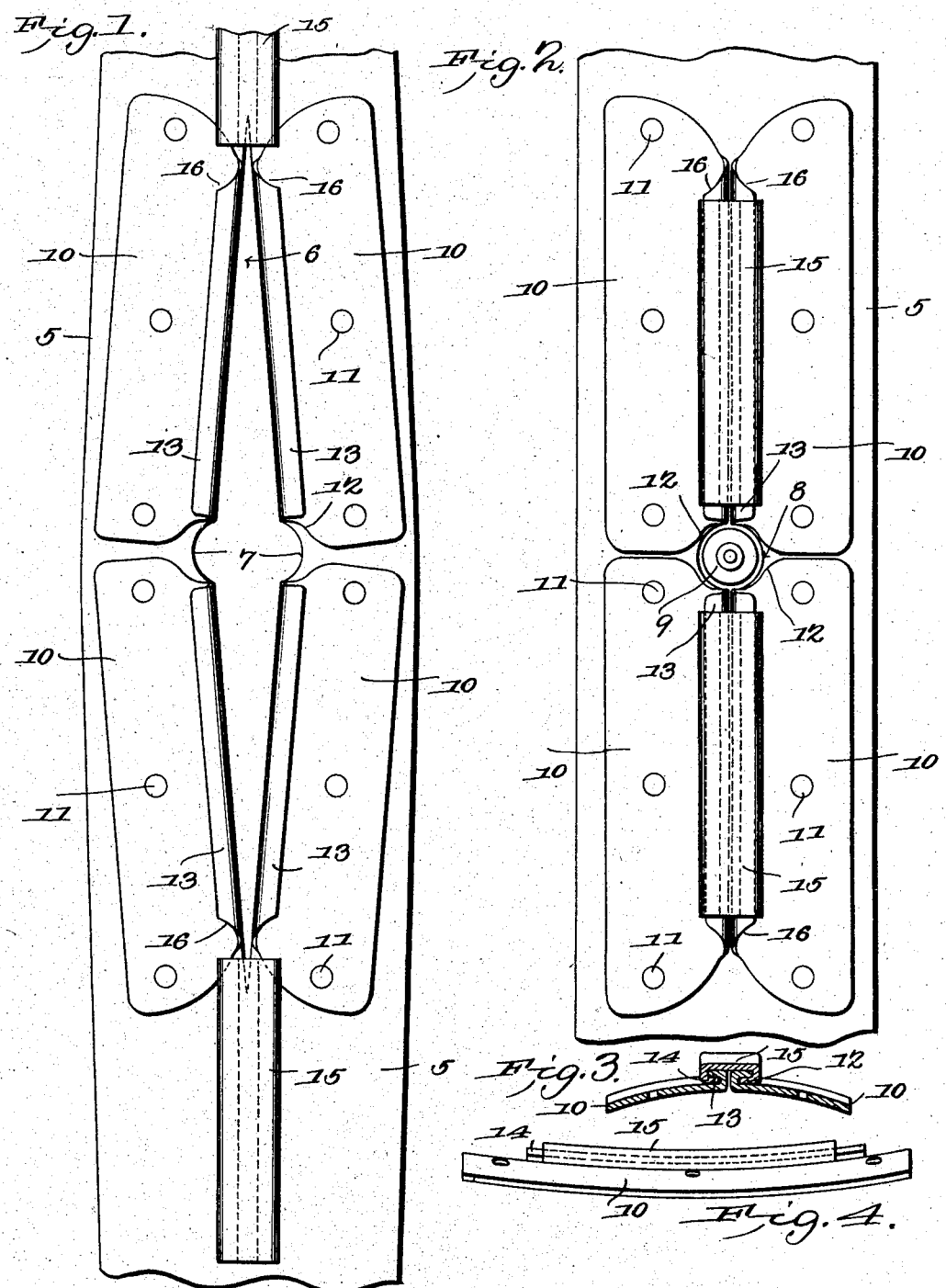

UNITED STATES PATENT OFFICE.

RICHARD J. VOSS, OF DAVENPORT, IOWA, ASSIGNOR OF ONE-HALF TO FRANK S. HARDING, OF DAVENPORT, IOWA.

DEVICE FOR CLOSING THE LONGITUDINAL SLITS IN PNEUMATIC TIRES.

SPECIFICATION forming part of Letters Patent No. 781,245, dated January 31, 1905.

Application filed November 2, 1904. Serial No. 231,144.

*To all whom it may concern:*

Be it known that I, RICHARD J. VOSS, a citizen of the United States, residing at Davenport, in the county of Scott and State of Iowa, have invented a new and useful Device for Closing the Longitudinal Slits in Pneumatic Tires, of which the following is a specification.

This invention relates to pneumatic tires for bicycle, automobile, and vehicle wheels in general, and more particularly to a device for closing the longitudinal slit or opening usually formed in the tire to permit the introduction of the inner tube.

The object of the invention is to provide a simple, inexpensive, and efficient device of this character by means of which the adjacent edges of the tire at the longitudinal opening may be quickly and conveniently secured together without the use of cords, spring-clips, and similar fastening devices.

The invention consists in the construction and novel combination and arrangement of parts hereinafter fully described, illustrated in the accompanying drawings, and pointed out in the claims hereto appended, it being usually understood that various changes in form, proportion, and minor details of construction may be resorted to without departing from the principle or sacrificing any of the advantages of this invention.

In the accompanying drawings, forming a part of this specification, Figure 1 is an inverted plan view of a portion of a bicycle or automobile tire provided with my improved device, showing the longitudinal slit open or distended for the reception of the inner tube. Fig. 2 is a similar view showing the slit or opening closed. Fig. 3 is a transverse sectional view of the device detached, and Fig. 4 is a side elevation.

Similar numerals of reference indicate corresponding parts in all the figures of the drawings.

The device forming the subject-matter of the present invention may be used in connection with any of the approved forms of pneumatic tires now in general use and by way of illustration is shown attached to the outer tube 5 of an ordinary double-tube tire. The tire 5 is provided with the usual longitudinal slit or opening 6 for the reception of the inner tube, and the side walls of said opening are preferably formed with semicircular recesses 7, which form a centrally-disposed aperture 8, adapted to receive the valve 9 of the inner tube when the slit or opening 6 is closed.

The device comprises a plurality of transversely-curved plates 10, secured in any suitable manner, as by rivets 11, to the exterior walls of the outer tube 5, said plates being arranged in pairs on each side of the longitudinal slit 6 with their adjacent ends disposed at the aperture 8 and curved, as indicated at 12, to permit the passage of the valve 9. The plates 10 are provided with laterally-extending marginal flanges or lips 13, arranged adjacent to and parallel with the walls of the slit or opening 6 and adapted to engage the inwardly-projecting lips 14 of closing-slides 15, so that when the slides are moved longitudinally in the direction of the aperture 8 the side walls of the slit or opening 6 will be drawn together and said opening securely closed. The ends of the flanges 13 are preferably inclined or beveled, as indicated at 16, to facilitate the introduction of the slides 15, and said slides, as well as the plates 10, are preferably curved longitudinally to conform to the contour of the tire and prevent the plates from cutting or otherwise injuring the former.

In practice the inner tube is introduced through the longitudinal slit 6 in the usual manner with the valve 9 disposed in position to engage the semicircular recess 7 when said slit is closed, the latter being accomplished by drawing the slides longitudinally in opposite direction toward the valve, as before stated, thereby preventing accidental displacement of the inner tube and effectually excluding the entrance of dust, dirt, or other foreign matter to the interior of the outer tube.

By having the curved plates disposed in pairs on each side of the valve-opening instead of employing continuous rigid plates it permits the side walls of the longitudinal opening to expand sufficiently to admit the inner tube without danger of slitting the tire when lateral stress is exerted on said plates.

Having thus described the invention, what is claimed is—

1. A device of the class described comprising a plurality of plates arranged in pairs and adapted to be secured to the tire on each side of the longitudinal opening in the latter, laterally-extending marginal flanges carried by the plates, and a slide provided with inwardly-projecting flanges adapted to engage the marginal flanges of each pair of plates for closing said longitudinal opening.

2. A device of the class described comprising a plurality of plates arranged in pairs and adapted to be secured to the tire on each side of the longitudinal opening therein, laterally-extending marginal flanges carried by the plates and having their ends inclined or beveled, and a slide adapted to engage the marginal flanges of each pair of plates for closing said longitudinal opening.

3. A device of the class described comprising a plurality of longitudinally and transversely curved plates having their adjacent ends spaced apart and secured to the tire on each side of the longitudinal opening therein, laterally-extending flanges carried by the plates, and a slide adapted to engage each pair of plates for closing said longitudinal opening.

4. The combination with a tire having a longitudinal opening formed therein, the side walls of which are provided with alined recesses, a plurality of transversely and longitudinally curved plates arranged in pairs and secured to the tire on each side of the longitudinal opening and having their adjacent ends spaced apart and recessed to conform to the recesses in the side walls of the longitudinal opening, laterally-extending flanges carried by the plates, and a slide adapted to engage the flanges of each pair of plates for closing said longitudinal opening.

5. A device of the class described comprising a pair of longitudinally and transversely curved plates adapted to be secured to the tire one on each side of the longitudinal opening therein, laterally-extending flanges carried by the plates, and a longitudinally-curved slide adapted to engage said flanges for closing the opening in the tire.

In testimony that I claim the foregoing as my own I have hereto affixed my signature in the presence of two witnesses.

RICHARD J. VOSS.

Witnesses:
JOHN HEINZ,
GEO. BUTENSCHOEN.